S. G. Cabell,
Crimping Machine
No. 3856. Reissued Mar. 1. 1870
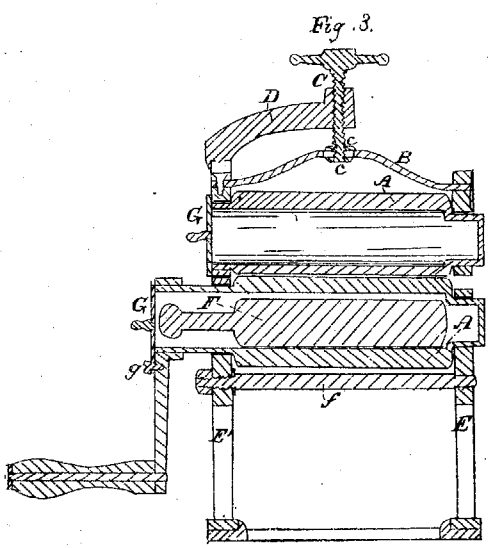
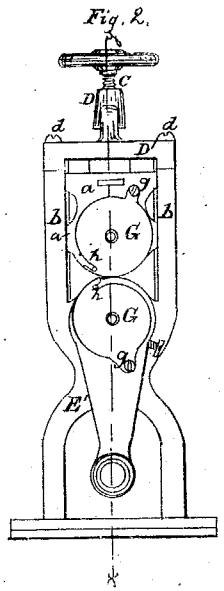
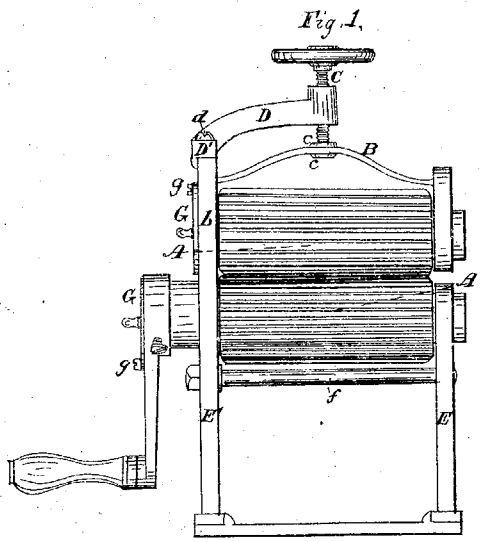
Witnesses.
M. W. Ward.
Gilbert B. Fowler
Inventor.
Samuel G. Cabell

UNITED STATES PATENT OFFICE.

FLORA B. CABELL, OF QUINCY, ILLINOIS, ASSIGNEE OF SAMUEL G. CABELL.

IMPROVEMENT IN CRIMPING-MACHINES.

*Specification forming part of Letters Patent No.* 56,365, *dated July* 17, 1866; *reissue No.* 3,856. *dated March* 1, 1870.

*To all whom it may concern:*

Be it known that S. G. CABELL, of Quincy, in the county of Adams and State of Illinois, has invented certain new and useful Improvements in Fluting or Crimping Machines; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use said invention, I will proceed to describe it.

The nature of this invention consists in certain improvements in the construction of machines for fluting linens, laces, &c., as hereinafter more fully explained.

In the drawing, Figure 1 is a rear elevation of the improved machine complete, ready for use. Fig. 2 is an end view, and Fig. 3 is a longitudinal vertical section, taken on the lines *x y* of Fig. 2.

In all machines of this character heretofore made, there have been objectionable features which rendered them difficult to use. In some, the upper roller has its supports so arranged that a long strip of fabric cannot be passed straight through between the rolls, the support being in the way. In others, the upper roll, instead of being mounted so that it can be raised bodily, is so arranged that it rests constantly on the lower roll. Others, again, have the rolls mounted in duplicate bearings at one end only, while none are provided with any means for closing the end of the hollow rolls, to prevent the escape of the heat, and also to prevent the burning the hand at the end while operating the machine.

The object of this invention is to remedy these and other difficulties, and to provide a simple, efficient, and cheap machine for general or family use.

In constructing the improved machine, a frame is first provided, consisting of a base having two uprights, E and E′, one at each end, the first rising high enough to form a bearing for one end of the lower roll, as shown by E in Figs. 1 and 3, the other one, E′, being made high enough to form a bearing for the upper roll, and also to support an arm, D, from which the upper roll is suspended and adjusted.

The upright E′ is made at its upper end with an opening large enough to receive and guide a sliding box, or collar, *a*, as shown in Fig. 2, the edges of the box *a* having grooves formed in them, which engage with and slide on the side pieces *b*, of the upper part of the upright E′. The sliding box *a* has a hole made in it to receive the journaled end of the upper roll A. The opposite end of the roll A is also journaled in a similar box or bearing; but this latter, instead of being mounted in an upright like the former, is attached to the end of a spring cross-bar, B, which has its opposite end secured to the sliding box, *a*, one of the boxes *a* being detachable from the cross-bar to enable the roll to be mounted therein, it being the sliding box *a* in this case that is thus attached, by entering a mortise in the box, and being secured there by a screw, as shown in Fig. 3.

Through the overhanging arm D a screw, C, passes, its lower end entering a slot in the spring-bar B, to which it is connected loosely by a washer, *c*, both above and below the bar, as shown in Figs. 1 and 3, this screw C thus serving to connect the bar B with its attached boxes *a*, which, together, form a yoke to the arm D overhead, and thereby suspending the upper roll from the arm D. It will, therefore, be seen that by turning the screw C, which has a hand-wheel for the purpose, the upper roll A can be raised clear from the lower roll, or can be pressed down upon it with any desired degree of pressure. By this arrangement of parts, it will also be seen that the roll is supported in bearings at each end, one of which serves to guide the roll in its movements up and down, and prevent it from getting out of line with the lower roll; and, further, that, by arranging the arm D in the manner shown, it is entirely out of the way, and thus leaves an unobstructed passageway for the fabric, in a straight line, through between the rolls, of an unlimited extent.

The lower roll is mounted in fixed bearings, in the uprights E and E′, as shown clearly in Fig. 3, both rolls being cast hollow, with one end closed, as represented in Fig. 3. The lower roll has one of its journals prolonged, so as to protrude through the upright E′ far enough to permit a crank to be attached to it, as shown in Figs. 1 and 3.

These rolls are to be heated when in use by the insertion of a heated iron, F, as represented in Fig. 3, in which the lower roll only is shown thus filled, though in use both are to be thus provided.

To prevent the heat from escaping from the open ends of the rolls A, they are provided with a cap or lid, G, by which they are closed after the heated iron is inserted. This lid may be formed in the shape of a plate, and hinged to the frame, so as to shut over the open end of the roll, where the roll does not protrude through or beyond the frame, as with the upper roll, in Figs. 1, 2, and 3, or it may be hinged to the end of the roll itself, where the latter protrudes, as shown with the lower roll in the same figures. It is obvious, however, that they may be made in the form of a cap or plug, made to fit into the end of the rolls, or, when the rolls protrude, they may slip on over the end. When hinged as shown, by a screw or pivot, *g*, they have a notch, *h*, cut in one edge, which engages on a pin, as the cap is closed over the opening, so as to hold it shut, a small handle or knob being attached to each cap or lid, G, by which to open and close it. These caps or lids also serve to prevent the heat of the iron from affecting the hand of the operator when turning the crank of the machine. By this means, also, the heat being retained in the cylinders or rolls much much longer than it would be if left open, it follows, of course, that it will not be necessary to stop and replace the irons F near as often as would otherwise be the case.

By this method of constructing the machine and arranging its parts, the difficulties heretofore existing in this class of machines are obviated, and a very simple, cheap, and efficient machine is produced.

Having thus described the invention, what I claim is—

1. Suspending the upper roll of a fluting-machine in adjustable bearings at each end, so arranged as to leave an unobstructed passageway for the fabric, at right angles to the plane of the axes of the rolls, substantially as described.

2. Mounting the upper roll in adjustable bearings at each end, one of which shall move in bearings in the frame in such a manner as to guide and direct the vertical movements of the roll, as set forth.

3. The rigid arm or support, D, located above the rolls, in such a manner as to leave an unobstructed passage for the fabric, in combination with a roll arranged to be raised and lowered, substantially as described.

4. The yoke, consisting of the bar B and the collars *a a*, one of which is made detachable, for the purpose of rendering the roll detachable, as described.

5. The combination of the upper fluted roll A and the yoke B having one of its bearings detachable, constructed and arranged to operate substantially as described.

6. A lid or cap, G, arranged to close the end of the hollow rolls, substantially as set forth.

7. In combination with the fluted rolls A A, supported in bearings at each end, and so arranged as to leave an unobstructed opening between their outer ends, for the introduction of the fabric, the spring B, or its equivalent, substantially as and for the purpose set forth.

FLORA B. CABELL.

Witnesses:

W. C. DODGE,

PHIL. T. DODGE.